H. B. BRUEGGEMANN.
MULTIPLE SPINDLE BORING MACHINE.
APPLICATION FILED SEPT. 3, 1918.

1,367,945.

Patented Feb. 8, 1921.
2 SHEETS—SHEET 1.

Inventor.
Henry B. Brueggemann,
by his Attorney.

H. B. BRUEGGEMANN.
MULTIPLE SPINDLE BORING MACHINE.
APPLICATION FILED SEPT. 3, 1918.

1,367,945.

Patented Feb. 8, 1921.
2 SHEETS—SHEET 2.

Inventor:
Henry B. Brueggemann,

UNITED STATES PATENT OFFICE.

HENRY B. BRUEGGEMANN, OF CINCINNATI, OHIO, ASSIGNOR TO J. A. FAY & EGAN COMPANY, OF CINCINNATI, OHIO, A CORPORATION OF WEST VIRGINIA.

MULTIPLE-SPINDLE BORING-MACHINE.

1,367,945. Specification of Letters Patent. Patented Feb. 8, 1921.

Application filed September 3, 1918. Serial No. 252,397.

*To all whom it may concern:*

Be it known that I, HENRY B. BRUEGGEMANN, a citizen of the United States, residing at Cincinnati, in the county of Hamilton and State of Ohio, have invented certain new and useful Improvements in Multiple-Spindle Boring-Machines, of which the following is a specification.

My invention relates to multiple spindle wood boring machines, and has for its object the provision of means whereby the boring spindles and driving means for the same are readily shiftable laterally and arranged to be accurately clamped in adjusted positions, with the driving means in self-centered relation with the drive-shaft, for maintaining accurate driving relation between the drive-shaft and the boring spindles; and, further, the provision of novel means for mounting and adjusting the boring spindles.

The invention will be further readily understood from the following description and claims, and from the drawings, in which latter:

Figure 1:
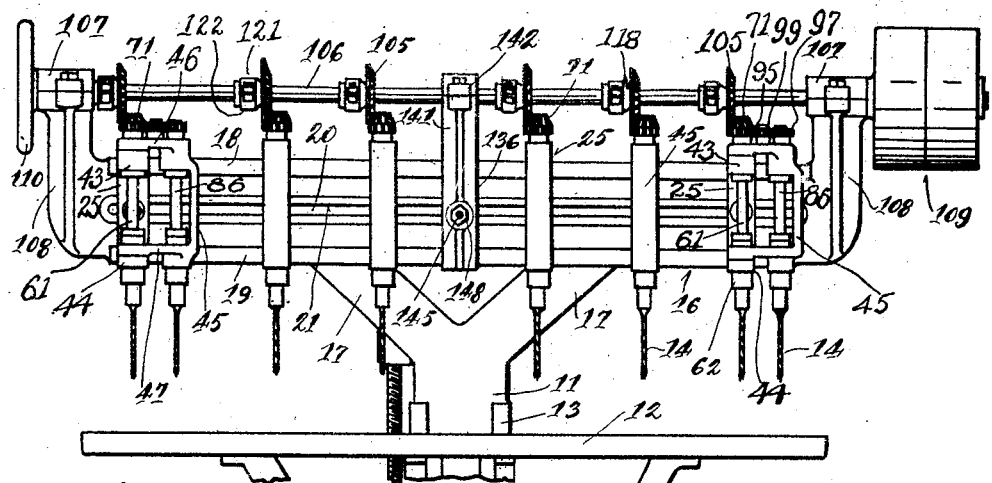
Figure 1 is a front elevation of my improved device, so much of a boring machine being shown as is necessary to illustrate my invention.
Figure 2:
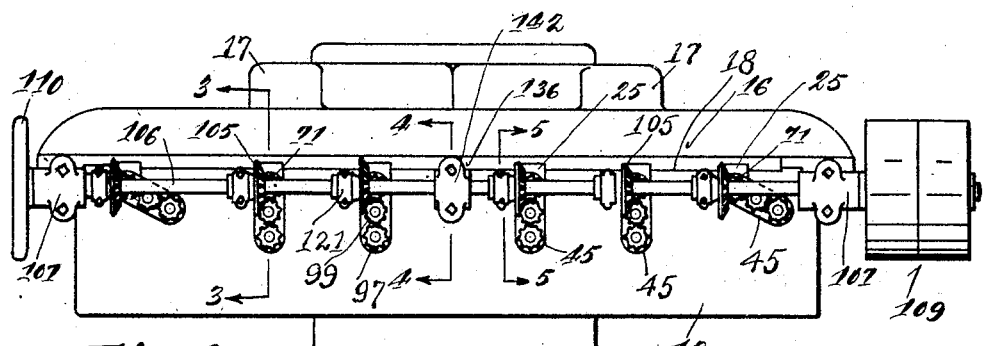
Fig. 2 is a plan view of the same.
Figure 7:
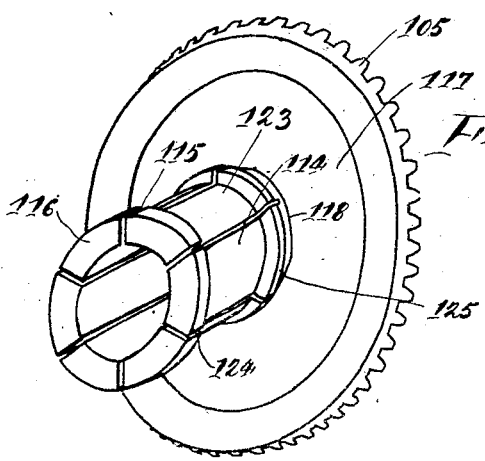
Fig. 7 is a perspective view of one of the drive-gears.
Figure 3:
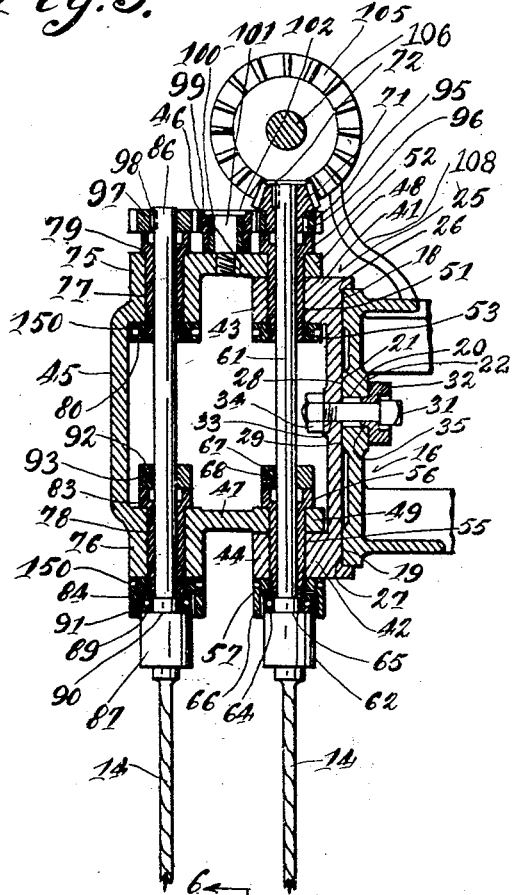
Fig. 3 is a vertical cross-section, taken in the axial lines of the spindles, on the line 3—3 of Fig. 2.
Figure 4:
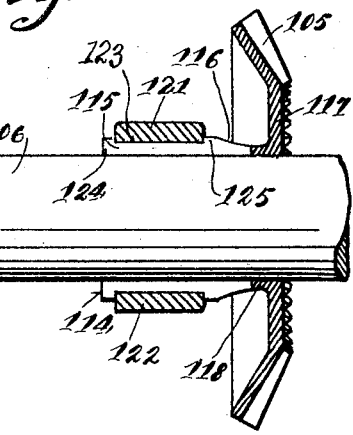
Fig. 4 is a vertical cross-section taken on the line 4—4 of Fig. 2, illustrating the intermediate shiftable supporting means for the drive-shaft.
Figures 5, 6:
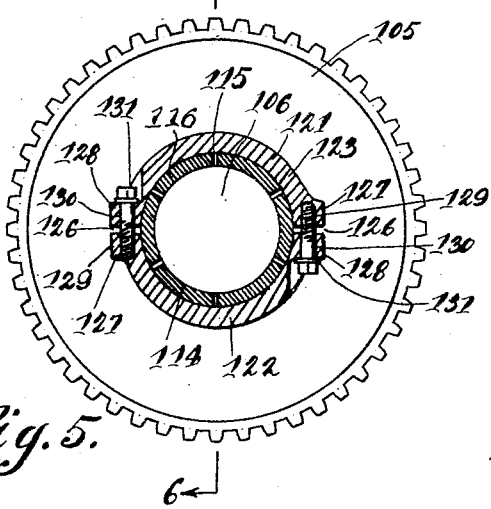
Fig. 5 is a detail in vertical cross-section, taken on the line 5—5 of Fig. 2, showing the self-centering means between the drive-shaft and the shiftable driving gears.
Fig. 6 is an axial section of the same, taken on the line 6—6 of Fig. 5.

The frame of the machine may comprise a suitable column 11, on which a table 12, adapted to support the work, is movable up and down on guideways 13, for moving the work into and out of range of the boring bits, a number of which are exemplified at 14.

A cross-rail 16 is supported by the column, preferably by means of laterally and upwardly extending braces 17, extending between the column and the cross-rail. The cross-rail is provided with guides 18, 19, and a slot 20, between said guides, the front walls of the slot forming guides 21, and the rear walls of the slot forming guides 22.

These slots and guides preferably extend throughout substantially the full width of the cross-rail, and are parallel with each other.

Slides 25 are provided with guideways 26, 27, which coact with the guides 18, 19, and with guide-faces 28, 29, which coact with the guides 21. The slides are arranged to be adjusted laterally to suitable or desirable position on the cross-rail, the slides being preferably of narrow width, and arranged so that numbers of them can be arranged side by side lengthwise of the cross-rail and spaced apart suitable and desirable distances according to the work, the positions of the holes to be bored, and the spaces between them which may be desired.

The guideways on the slide coact with the guides on the cross-rail to insure parallel positions of the boring bits. When the slides have been adjusted into the desired lateral positions, they are clamped to the cross-rail, as by means of a bolt 31, received through a clamp-block 32, and through a hole 33 in the slide, a nut 34 being received about the threaded forward end of the bolt for clamping the head of the bolt, the clamp-block, the cross-rail and the slide firmly together. The clamp-block is provided with a tongue 35 received in the groove, so as to position the bolt centrally with relation to the groove, the hole in the slide being also central with relation to the groove, so that the strain of the clamping action is in true lines perpendicular to the forward face of the clamp-block, the guide-faces 18, 19, 22 and 21 on the cross-rail and the guide-faces 26, 27, 28, 29 on the slide.

The slide is preferably in the form of a yoke having forwardly extending brackets 41, 42, in which bearings 43, 44, are located. A swinging yoke 45 is provided with brackets 46, 47, having bearings 48, 49, therein. A bushing 51 is received through the bearing 43 and the bearing 48, being provided with an annular shoulder 52 at one end thereof and having its other end threaded for receiving a clamp-nut 53 thereover. A bushing 55 is received through the bearings 44, 49, and has an annular shoulder 56 at one end thereof, the other end thereof being threaded and receiving a clamp-nut 57 thereover.

A spindle 61 is journaled in the bushings 51, 55, and is provided at its lower end with a suitable chuck 62, in which a suitable drill or boring bit 14 is arranged to be suitably secured, there being an end-thrust ball-bearing 64 between the annular shoulder 65 of said chuck and the bushing 55, for providing ease of rotation of the boring spindle. The clamp-nut 57 is provided with a depending annular canopy 66 received over the ball-bearing.

A collar 67 is arranged to be secured to the spindle, as by means of a set-screw 68, for positioning the spindle vertically.

Suitable means are provided for driving the spindle, these means being instanced as a bevel-gear 71 secured to the spindle, as by means of a key 72.

The yoke 45 is provided with bearings 75, 76, in which bushings 77, 78, are received. The bushing 77 is provided with an annular shoulder 79, at one end thereof, and has its other end screw-threaded, a clamp-nut 80 being received about said threaded end for clamping the bushing in the bearing 75.

The bushing 18 is provided with an annular shoulder 83 at one end thereof, the other end thereof being threaded for receiving a clamp-nut 84 for clamping the bushing in the bearing 76.

A spindle 86 is journaled in the bushings 77, 78. The spindle is provided at its lower end with a chuck 87 in which a suitable drill or boring bit 14 is arranged to be suitably secured. An end thrust ball-bearing 89 is received between an annular shoulder 90 of the chuck and the bushing 78. The clamp-nut 84 is provided with a depending annular canopy 91 received over the ball-bearing. Either of the spindles may be removed without affecting the supports for the slides or the swinging yokes. A collar 92 is arranged to be secured to the spindle, as by means of a set-screw 93, for positioning the spindle vertically.

The spindle 86 is driven from the spindle 61, instanced as accomplished by means of a spur-gear 95 rigidly secured to the hub of the bevel-gear 71, as by means of a key 96. A spur-gear 97 is rigidly secured to the drill-spindle 86, as by means of a key 98. An intermediate spur-gear 99 is secured so as to rotate on the yoke, as by means of being journaled about a bushing 100 held to the yoke by means of a shoulder bolt 101 fixedly screwed into the yoke and provided with a shoulder 102 for clamping the bushing 100 in place.

The yoke is arranged to be swung about the axis of the spindle 61 so as to cause the boring bit 14 on the spindle 86 to operate at any desired position radially with relation to the boring bit 14 on the spindle 61. When the same has been positioned, the clamp-nuts 53 and 57 are drawn up tightly for clamping the bearings 43, 48, and 44, 49, rigidly together.

The positioning of the slides laterally on the cross-rail and the swinging of the yoke about the axis of the shaft 61, enable the boring bits to be placed at any desired location above the table, for positioning the relations of the holes made by the bits. Either one or both of the bits on the slide may be employed, and as many bits as desired or as many slides as desired may be employed within the capacity of the machine. The boring bits may be of any desired diameter or length, and any desired character of boring bits, either single or multiple, may be employed on the spindles.

In order to insure accuracy in the boring, and to provide ease of rotation of the spindles and prevent uneven wear in the bearings, and permit adjustments of the slides, it is desirable that the driving relation of the driving member coacting with the bevel-gears 71, shall always be the same, regardless of the positions of the slides and adjustments of the spindles.

For accomplishing this I provide bevel-gears 105, which are shiftable lengthwise of a drive-shaft 106, journaled in bearings 107, in brackets 108, extending from the cross-rail. Suitable driving means may be provided for the drive-shaft, exemplified as tight and loose pulleys 109, and manually operating means for the drive-shaft exemplified as a hand-wheel 110, may also be provided, for instance, when it is desired to back any of the boring bits out of the work or for testing the work, or positioning the bits.

To insure accuracy of relation between the bevel-gears 105 and the bevel-gears 71 at all positions of the slides, and to arrange for proper meshing relation between said bevel-gears at all such positions, I provide the bevel-gears 105 with hubs 114, shown as elongated hubs. The hub of the driving bevel-gear is provided with slots 115 for cutting the hub into a number of sectors 116 extending lengthwise of the hub, to a position proximate to the transverse web 117 of said bevel-gear. The base of the hub adjacent to the web of the bevel-gear is preferably reduced in thickness by providing said hub with an annular groove, whereby flexibility for the sectors 116 of the hub is assured.

Clamp-sectors 121, 122, are received about the hub-sectors preferably in an annular recess 123 therein, the annular recess forming shoulders 124, 125, between which the clamp-sectors are secured. The clamp-sectors are preferably duplicates of each other and are preferably just a trifle less than half the circumference of the cylinder formed by the bottom of the annular recess 123, so as to leave clamping spaces 126 between the flanges 127, 128, of said clamp-sectors. The flanges 127 are provided with internal screw-threads 129, and the flanges 128 are provided with holes 130 through which bolts 131 pass for being threaded into said threaded holes. When the bolts are drawn up for drawing together the clamp-segments, the sector-tongues of the gear-hub are drawn together equally for self-centering the gear about the shaft.

The means stated provide ready and convenient means whereby the bevel-gears are arranged to be clamped to the drive-shaft at any selective position lengthwise of the drive-shaft without danger of injury to the drive-shaft, and with the assurance that an unyielding driving connection is formed between the drive-shaft and the bevel-gear. This connection also is an accurate connection, regardless of the position lengthwise of the drive-shaft at which the clamping may take place, insuring at all times a proper meshing relation between the driving bevel-gear on the drive-shaft and the driven bevel-gear on the boring spindle.

In operation, the boring slides and the swinging yokes thereon are adjusted to position on the cross-rail, and when the proper position has been determined and the parts have been clamped in place, the driving bevel-gear is moved up, so that proper meshing relation is had between the bevel-gears, whereupon the drive bevel-gear is clamped to the drive-shaft, whereby the drive bevel-gear is self-centered with relation to the drive-shaft.

In order to prevent yielding of the drive-shaft in any direction, I provide means arranged to be positioned so as not to interfere with any desired positions of any of the boring bits. For this purpose I provide a bearing slide 136, one of which is shown, the bearing slide being provided with guideways 137, 138, coacting with the guides 18, 19, and with guide-faces 139, 140, coacting with the guides 21 on the cross-rail. The slide is provided with an upright 141 on which there is a bearing 142 for the drive-shaft. The bearing slide may be positioned laterally to any desired point on the cross-rail and clamped in place in adjusted position, these clamping means being exemplified as a clamp-bolt 145 passing through a clamp-block 146 having a tongue 144 in the slot 20, and a hole 147 in the slide, a clamp-nut 148 clamping the parts rigidly together.

The slide 136 may be placed in desired relation to any of the slides 25, and any of the slides may be removed, or replaced, or substituted one for another.

The nuts 53, 57, 80, 84, are provided with suitable means for tightening the same, exemplified as peripheral holes 150 for the reception of a suitable spanner wrench or suitable tool. These clamp-nuts, and the nuts 31, 131, set-screw 68, as well as the clamp-nuts 34, 148, are conveniently manipulated from the front of the machine, namely the operator's position A, so that the operator may make all of his adjustments while viewing the machine and the work in the same relation which he occupies when performing the work, providing ease, convenience and accuracy in making the adjustments.

Having thus fully described my invention, what I claim as new and desire to secure by Letters Patent, is:

1. In means for mounting and adjusting boring spindles, the combination of a laterally adjustable slide provided with upper and lower bearing-brackets, a swingable spindle-housing provided with upper and lower bearing-brackets coacting with said first-named bearing-brackets, a spindle journaled in the housing, a bushing through both the bearings of said upper bearing-brackets, a bushing through both the bearings of said lower bearing-brackets, said bushings provided with shoulders at one of the ends thereof and being threaded at the other of the ends thereof, and nuts received over said threaded ends, for clamping said bearing-brackets in adjusted positions, and a spindle journaled in said bushings.

2. In means for mounting and adjusting driving spindles, the combination of a laterally adjustable slide provided with upper and lower bearing-brackets, a swingable spindle-housing provided with upper and lower bearing-brackets coacting with said first-named bearing brackets, a spindle journaled in the housing, a bushing through both the bearings of said upper bearing brackets, a bushing through both the bearings of said lower bearing-brackets, said bushings provided with shoulders at one of the ends thereof and being threaded at the other of the ends thereof, and nuts received over said threaded ends, for clamping said bearing-brackets in adjusted positions, a spindle journaled in said bushings, an end-thrust bearing for said spindle at the outer end of one of said bushings, the clamping nut at said end of said bushing provided with a canopy received over said end-thrust bearing.

In testimony whereof I have hereunto signed my name in the presence of two subscribing witnesses,

HENRY B. BRUEGGEMANN.

Witnesses:
J. CASSIDY GRIMES,
CATHARINE CROLLEY.